United States Patent [19]
Taylor et al.

[11] Patent Number: 5,311,927
[45] Date of Patent: May 17, 1994

[54] AIR CONDITIONING AND REFRIGERATION APPARATUS UTILIZING A CRYOGEN

[75] Inventors: David H. Taylor, Minneapolis; Herman H. Viegas, Bloomington, both of Minn.; Roland L. Roehrich, Pittsburgh, Pa.

[73] Assignee: Thermo King Corporation, Minneapolis, Minn.

[21] Appl. No.: 982,370

[22] Filed: Nov. 27, 1992

[51] Int. Cl.$^5$ ............................... F25B 29/00
[52] U.S. Cl. .................... 165/64; 165/61; 62/54.1; 62/156; 62/239; 62/333
[58] Field of Search .............. 165/58, 61, 62, 64; 62/156, 159, 199, 239, 333, 54.1

[56] References Cited

U.S. PATENT DOCUMENTS

| | | | |
|---|---|---|---|
| 3,621,673 | 11/1971 | Foust | 165/58 X |
| 3,802,212 | 4/1974 | Martin et al. | 62/156 X |
| 4,045,972 | 9/1977 | Tyree, Jr. | 62/156 |
| 4,100,759 | 7/1978 | Tyree, Jr. | 62/165 X |
| 4,186,562 | 2/1980 | Tyree, Jr. | 62/239 X |
| 4,498,306 | 2/1985 | Tyree, Jr. | 62/239 X |
| 4,606,198 | 8/1986 | Latshaw et al. | 62/205 |
| 4,941,527 | 7/1990 | Toth et al. | 165/61 X |
| 5,040,374 | 8/1991 | Micheau | 62/52.1 |
| 5,069,039 | 12/1991 | Martin | 62/156 |
| 5,090,209 | 2/1992 | Martin | 62/156 |

Primary Examiner—John Rivell
Attorney, Agent, or Firm—M. J. Moran

[57] ABSTRACT

A refrigeration system associated with a conditioned space to be controlled to a predetermined set point temperature via heating and cooling cycles. The refrigeration system includes a fluid flow path through which a predetermined liquid is circulated. The fluid flow path includes a slush tank and first and second heat exchangers, with cryogen from a supply vessel being expanded into liquid disposed in the slush tank. The first heat exchanger is disposed to condition the air of the conditioned space, and the second heat exchanger is in heat exchange relation with heating apparatus. The first heat exchanger and slush tank are interconnected when the conditioned space requires a cooling cycle, and the first and second heat exchangers are interconnected when the conditioned space requires a heating cycle. Cryogen of the cryogenic cooling apparatus is thus not expended to heat the conditioned space, or for defrosting purposes.

15 Claims, 2 Drawing Sheets

AIR CONDITIONING AND REFRIGERATION APPARATUS UTILIZING A CRYOGEN

TECHNICAL FIELD

The invention relates in general to air conditioning and refrigeration systems, and more specifically to the use of a cryogen for controlling the temperature of a conditioned space associated with stationary and transport applications of air conditioning and refrigeration systems.

BACKGROUND ART

Stationary and transport applications of air conditioning and refrigeration systems, with transport applications including those systems used with straight trucks, tractor-trailer combinations, refrigerated containers, and the like, conventionally utilize a chlorofluorocarbon (CFC) refrigerant in a mechanical refrigeration cycle. The mechanical refrigeration cycle requires a refrigerant compressor driven by a prime mover, which often includes a dedicated internal combustion engine, such as a diesel engine. Because of the suspected depleting effect of CFC's on stratospheric ozone ($O_3$), practical alternatives to the use of CFC's are being sought.

The use of a cryogen, i.e., a gas which has been compressed to a very cold liquid state, such as carbon dioxide ($CO_2$) and nitrogen ($N_2$), in a transport refrigeration system is particularly attractive because, in addition to eliminating the need for a CFC, it also eliminates the need for a compressor and associated prime mover. Refrigeration systems of which we are aware which utilize a cryogen, implement a cooling cycle by circulating the cryogen through a fluid path which includes a heat exchanger disposed in heat exchange relation with air from a conditioned space. When a heating cycle is required to hold the temperature of the conditioned space within a temperature range close to a selected set point temperature, or a defrost cycle is required, the cryogen is heated by a suitable burner and combustible fuel, and the heated cryogen is circulated through the fluid path. Thus, cryogen is expended to the atmosphere during a cooling cycle, and cryogen plus a fuel associated with the heat source, such as propane, liquid natural gas, diesel fuel, and the like, are expended to the atmosphere to implement heating and defrost cycles.

It would be desirable, and it is an object of the present invention, to provide a new and improved cryogenic based refrigeration system, which more effectively and efficiently utilizes a cryogen, for lower cost operation, as well as for an extended operating time for a given vessel of cryogen.

SUMMARY OF THE INVENTION

Briefly, the present invention is an air conditioning and refrigeration system, hereinafter called a "refrigeration system", which is associated with a conditioned space to be controlled to a predetermined temperature range closely adjacent to a selected set point temperature via heating and cooling cycles. The refrigeration system includes heating means, cryogenic cooling means which includes a supply vessel containing a cryogen, and a fluid flow path having a predetermined heat exchange fluid, i.e., a liquid, therein. The heat exchange liquid will hereinafter be called a "secondary fluid", with the primary fluid being a cryogen. Means, such as a pump, or a thermosiphon arrangement, circulates the secondary fluid in the fluid flow path.

A slush tank and first and second heat exchanger means are disposed in the fluid flow path, with the first heat exchanger means being in heat exchange relation with the conditioned space. Cryogen from the supply vessel is expanded directly into the secondary fluid in the slush tank to form a mixture of secondary fluid and cryogen. The word "slush" is used to describe the tank as when the cryogen is $CO_2$, a solid phase of the $CO_2$ forms in the secondary fluid to form a slush mixture of secondary fluid and $CO_2$. With other cryogens, any slush which may form will be strictly composed of the secondary fluid, as the cryogen will evaporate. For purposes of example, it will be assumed that the cryogen, but other cryogens may be used to cool the secondary fluid in the slush tank. The second heat exchanger means is in heat exchange relation with the heating means. The fluid flow path is configured via associated electrical control to interconnect the first heat exchanger means and the slush tank when the conditioned space requires a cooling cycle. When a heating/defrost cycle is required, the electrical control reconfigures the fluid flow path to interconnect the first and second heat exchanger means. Thus, cryogen of the cryogenic cooling means is not utilized to heat the conditioned space, or the first heat exchanger means, during heating and defrost cycles.

In a preferred embodiment of the invention, air mover means for moving air between the conditioned space and the first heat exchanger means includes a vapor motor driven by cryogen obtained from the supply vessel. To minimize the amount of cryogen required for driving the vapor motor, the cryogen is preferably heated to an elevated temperature via a burner and fuel supply.

The cryogen exiting the vapor motor, or hot gases produced as a by-product of the burner, may be directed to a pressure building arrangement associated with the primary supply vessel, to obtain the quantity of vaporized cryogen required to achieve a desired fan or blower horsepower.

When the refrigeration system is associated with a transport application which includes a driven vehicle, a portion of the secondary heat exchange fluid may be used to condition the air of a driver's cab for the driver's comfort when the truck is parked and occupied, making it unnecessary to keep the truck engine running. In such an application, the vapor motor may be arranged to drive an electrical alternator or generator for maintaining a vehicle battery fully charged while the vehicle is parked with the engine off. Thus, an electrical motor and fan may be used to circulate cab air in heat exchange relation with a cab mounted heat exchanger, through which a portion of the secondary fluid of the refrigeration system is circulated.

When the conditioned space is compartmentalized, having two or more conditioned spaces to be conditioned, the secondary fluid may be directed successively through heat exchangers associated with each conditioned space, starting with the lowest temperature conditioned space and successively proceeding to each higher temperature conditioned space.

An alternative arrangement when the conditioned space is compartmentalized includes connecting heat exchangers associated with the different conditioned spaces in parallel with respect to the supply of cryogen. The flow rates of the cryogen through each heat exchanger are individually controlled to satisfy the temperature requirements of their associated compartments.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

As used in the following description and claims, the term "conditioned space" includes any space to be temperature and/or humidity controlled, including stationary and transport applications for the preservation of foods and other perishables, maintenance of a proper atmosphere for the shipment of industrial products, space conditioning for human comfort, and the like. The term "refrigeration system" is used to generically cover both air conditioning systems for human comfort, and refrigeration systems for preservation of perishables and shipment of industrial products. Also, when it is stated that the temperature of a conditioned space is controlled to a selected set point temperature, it is to be understood that the temperature of the conditioned space is controlled to a predetermined temperature range adjacent to the selected set point temperature. In the Figures, valves which are normally open (n.o.), are illustrated with an empty circle, and valves which are normally closed (n.c.) are illustrated with an "X" within a circle. Of course, the associated electrical or electronic control, hereinafter called "electrical control", may be changed to reverse the de-energized states shown. An arrow pointed at a valve in the Figures indicates that the valve is, or may be, controlled by the electrical control.

The invention is suitable for use when the refrigeration system is associated with a single conditioned space to be controlled to a selected set point temperature; and, the invention is also suitable for use when the refrigeration system 10 is associated at least first and second separate conditioned spaces to be individually controlled to selected set point temperatures.

Figure 1:
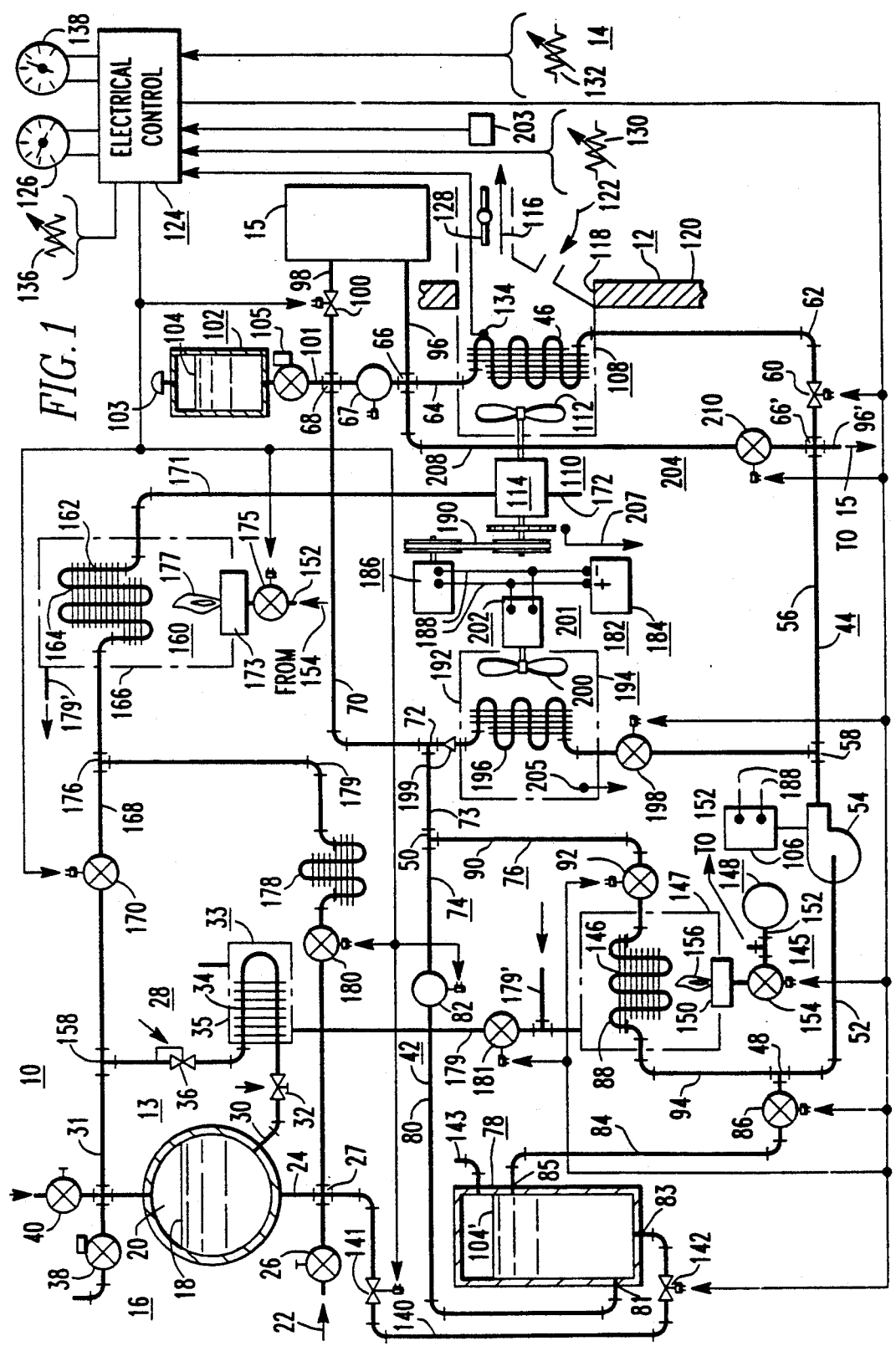
FIG. 1 is diagrammatic representation of a refrigeration system constructed according to a first embodiment of the invention wherein a secondary fluid is circulated in a fluid flow path via a pump.

Referring now to the drawings, and to FIG. 1 in particular, there is shown a refrigeration system 10 suitable for use with a conditioned space in stationary and transport applications, and it is particularly well suited for transport applications, such as those used on straight trucks, tractor-trailer combinations, containers, and the like, with the word "vehicle" being used to generically refer to the various transport vehicles which utilize refrigeration systems. Reference number 12 generally indicates a vehicle 12 in a transport application, and a wall of a conditioned space in a stationary application. Refrigeration system 10 may be associated with a single conditioned space 14 to be controlled to a pre-selected set point temperature, and, as hereinbefore stated, it may also be associated with two or more separate conditioned spaces to be individually controlled to selected set point temperatures. A second conditioned space and associated air conditioning apparatus is indicated generally at 15. In a compartmentalized transport application, for example, conditioned space 14 may contain a frozen load, while the conditioned space indicated at 15 contains a fresh load; or, fresh loads may be conditioned in each, with the optimum temperature for each load being maintained.

Refrigeration system 10 includes cryogenic cooling means 13. Cryogenic cooling means 13 includes a thermally insulated, or a vacuum, supply vessel 16 containing a suitable cryogen, such as liquid nitrogen ($N_2$), or liquid carbon dioxide ($CO_2$), for example, with the liquid phase of the cryogen being indicated at 18. Vessel 16 also contains cryogen 20 in vapor form, above the liquid level. Vessel 16 may be filled, for example, by connecting ground support apparatus, shown generally at 22, to a supply line or conduit 24 which includes a valve 26 and a four-way connector 27.

Vapor pressure in vessel 16 is maintained above a predetermined value by a pressure building and regulating arrangement 28 in which conduits 30 and 31 respectively connect pressure building means 33 to lower and upper points of vessel 16. Conduit 30, which connects a low point of vessel 16 to pressure building means 33, includes a valve 32. The pressure building means 33 includes a vaporizing coil 34, which may be directly exposed to ambient temperatures, or which may be disposed within a housing 35, as will be hereinafter explained. Conduit 31, which connects pressure building means 33 to a high point of vessel 16, includes a valve 36. Valve 36 maintains the vapor pressure in vessel 16 at a predetermined value, which may be determined and selected each time vessel 16 is filled, if necessary. A pressure reading safety valve 38 is provided in conduit 31 at a point where the vapor pressure in vessel 16 may be directly sensed. A venting valve 40 is also provided to facilitate the filling process. Valve 40 may be connected to ground support apparatus 22 during filling, if desired.

Valve 32 opens when the pressure in vessel 16 falls to a predetermined value. The predetermined value depends upon the cryogen utilized and system design, and is selected to enable the cryogen to flow into the pressure building arrangement 28, and into other portions of the refrigeration system 10. When the cryogen is $CO_2$, the predetermined value is selected to be above the triple point of $CO_2$, i.e., 75.13 psia, and, accordingly, arrangement 28 regulates the vapor pressure in vessel 16 to at least about 80 psia.

As hereinbefore stated, valve 32 admits liquid cryogen into vaporizing coil 34, and vaporizing coil 34 is exposed to ambient temperature. As disclosed in concurrently filed application Ser. No. 07/982,333, vaporizing coil 34 may be exposed to higher temperatures than ambient, especially during low ambient temperature conditions, by utilizing gases produced as products of combustion of a fuel used during heating and defrost cycles, and also from a fuel used to produce higher fan horsepower; or, by utilizing cryogen, when it is warmer than the ambient temperature, just before the cryogen is exhausted to the atmosphere.

Using $CO_2$ as an example of a suitable cryogen, vessel 16 may be filled with $CO_2$ at an initial pressure of about 100 psia and an initial temperature of about −58° F. (−50° C.). Of course, other pressures and temperatures may be used than set forth in this example, such as 300 psia and 0° F. (−17.8° C.)

The present invention includes a fluid flow path 42 having a first portion 44 which includes a first heat exchanger 46. The first portion 44 extends between tees 48 and 50, with the first portion 44 including, from tee 48 to tee 50, a conduit 52, a pump 54, a conduit 56, a tee 58, a connector 66', a flow control valve 60, a conduit 62, the first heat exchanger 46, a conduit 64, a connector 66, a valve 67, a connector 68, a conduit 70, a tee 72, and a conduit 73.

The fluid flow path 42 includes second and third portions 74 and 76 which are connected in parallel with the first portion 44, each extending between tees 48 and 50. The second portion 74 includes a slush tank 78, which is connected between tees 50 and 48 via a conduit 80 which includes a valve 82, and a conduit 84 which includes a valve 86. For adequate mixing of the returning secondary fluid with the mixture of secondary fluid and cryogen in tank 78, conduit 80 preferably enters slush tank 78 at point 81, which is located above a low point 83 on tank 78 and below a point 83 on tank 78 where conduit 84 leaves slush tank 78. The third portion 76 of fluid flow path 42 includes a second heat exchanger 88, which is connected between tees 50 and 48 via a conduit 90 which includes a valve 92, and a conduit 94.

The second conditioned space and air conditioning apparatus indicated at 15, is provided when conditioned space 14 is compartmentalized to define one or more additional conditioned spaces. Apparatus 15 is connected between connectors 66 and 67 via conduits 96 and 98, with one of the conduits, such as conduit 98, including a flow control valve 100. Valve 67 is closed when apparatus 15 is operational.

In a second embodiment of apparatus, apparatus 15 is connected in parallel with the first heat exchanger 46, instead of in series, with respect to supply vessel 16. In this alternate embodiment, connector 66 is located in conduit 56, instead of in conduit 64, as indicated by connector 66' and conduit 96', and valve 67 may be replaced by a check valve.

An expansion and fill tank 102, for filling fluid path flow 42 with a heat-exchange or secondary fluid 104, and also for allowing temperature induced expansion and contraction of the secondary fluid 104, is connected to connector 68 via a conduit 101. Tank 102 may be open to the atmosphere via a vent 103, or pressurized above atmospheric pressure, as desired. A pressure valve 105 may be located in conduit 101 to add secondary fluid 104 to, and to remove secondary fluid 104 from, the fluid flow paths. When tank 102 is not isolated from the system via valve 105, the levels in tanks 78 and 102 will be at the same elevation. The secondary fluid 104 should be a wide range liquid coolant selected to have good heat transfer and good transport properties while remaining in a liquid state throughout the different temperatures it will be subjected to. An example of a suitable fluid for the secondary fluid 104 is D-Limonene, a trade name of Florida Chemical Co., Inc., Lake Alfred, Fla.

The first heat exchanger 46 is associated with an air conditioning means 108 which includes air mover means 110. Air mover means 110 includes a fan or blower 112 driven by a suitable motor 114. In a preferred embodiment of the invention, motor 114 is a vapor driven motor or turbine, hereinafter referred to as vapor motor 114, which is driven by vaporized cryogen obtained from supply vessel 16 by arrangements which will be hereinafter explained. Air conditioning means 108 directs conditioned or discharge air, indicated by arrow 116, into conditioned space 14, via an opening 118 in a wall 120 surrounding conditioned space 14. Return air from conditioned space 14, indicated by arrow 122, is drawn through opening 118 by air mover means 110, and into heat exchange relation with the first heat exchanger 46.

Pump 54 may be belt driven by motor 114, or driven by an electric motor 106. Hydraulic and pneumatic motors may also be used. A suitable source of electrical power for motor 106 will be hereinafter described.

Electrical control apparatus 124 is provided to control the temperature of conditioned space 14 to a predetermined set point temperature which is selected by a set point selector 126. Electrical control 124 controls the temperature of conditioned space 14 via cooling and heating cycles, and also defrosts the first heat exchanger 46 and a heat exchanger associated with apparatus 15 to remove water ice build-up via a heating cycle. When it is desired that air mover means 110 remains operational during a defrost cycle, a controllable damper 128 may be provided to selectively close opening 118 during defrost. Damper 128 may be electrically operated, or pneumatically operated, such as by using the pressure of the cryogen in supply vessel 16. Electrical control 124 receives inputs from a return air temperature sensor 130, a discharge air temperature sensor 132, a coil temperature sensor 134, and an ambient air temperature sensor 136. When more than one conditioned space is conditioned, such as the additional conditioned space and air conditioning apparatus indicated generally at 15, a set point temperature selector is provided for each additional conditioned space, such as a set point temperature selector 138 for conditioned space 15. The additional conditioned space and associated air conditioning apparatus 15 is constructed in the same manner as conditioned space 14 and the associated air conditioning means 108, and is thus not shown in detail. Fans or blowers in the additional conditioned spaces may be driven by electric, hydraulic, pneumatic, or vapor motors, as desired.

The return air temperature, discharge air temperature, and ambient air temperature determine when electrical control 124 commands cooling, heating and null cycles, and the temperature of the coil surface of the first heat exchanger 46, detected by sensor 134, determines when a defrost cycle should be initiated. A defrost cycle may also be initiated by other means, such as by a timer, by a manually actuated switch, by a programmed algorithm, and the like.

Cryogenic cooling means 13 is connected to the low point 83 of slush tank 78 via the four-way connector 27, and a conduit 140 which includes a flow control valve 141 and expansion means 142, such as an expansion valve. When flow control valve 141 is opened to admit cryogen into slush tank 78 via expansion means 142, the cryogen is expanded to near atmospheric pressure as it enters the secondary liquid 104 contained in slush tank 78. When the cryogen is $CO_2$ it forms a mixture or slush 104' comprising $CO_2$ in the form of flakes and/or crystals and the secondary liquid 104. The mixture or slush 104' will be at a temperature of about $-110°$ F. ($-79°$ C.), when the cryogen 18 is $CO_2$, as at atmospheric pressure $CO_2$ solidifies at this temperature. Thus, when slush tank 78 is connected to the first heat exchanger 46 during a cooling cycle, the slush mixture 104' of solid particles of cryogen entrained in the secondary fluid or liquid 104 will absorb heat from the return air 122 as the return air flows in heat exchange relation with the first heat exchanger 46. Solid particles of cryogen in the secondary liquid 104 will be vaporized as the slush mixture 104' warms up, with this mixture of vaporized cryogen and secondary fluid 104 being returned to slush tank 78 where the vaporized cryogen exits the fluid flow path via an open vent 143. Vaporized cryogen may also exit the fluid flow path via vent 103 in expansion tank 102. It is to be understood that cryogens other than $CO_2$ may be used to cool the secondary fluid 104, in which event any slush formed in tank 78 will be due to solid particles of the secondary fluid 104 forming in the liquid secondary fluid 104.

The second heat exchanger 88 includes a plurality of coil turns or loops 146 disposed within a suitable housing 147. Coil turns 146 are heated by heating means 145. Heating means 145 includes a fuel source 148, such as propane, liquid natural gas, diesel fuel, and the like. In stationary applications, other sources may be used to heat the secondary fluid 104, such as electric power, hot liquids, steam, waste gases, and the like. Fuel from source 148 is selectively directed to a burner 150 via a conduit 152 and a valve 154. When electrical control 124 opens valve 154 to initiate the heating of coil turns 146 and the secondary fluid 104 therein, burner 150 is simultaneously ignited to provide a flame indicated at 156.

As disclosed in concurrently filed application Ser. No. 07/982,364, FIG. 1 illustrates providing independent control over fan or blower 112, enabling fan or blower 112 to circulate air throughout conditioned space 14 during cooling and heating cycles, and also during a null cycle initiated when refrigeration system 10 does not require heating or cooling to maintain the selected set point temperature in conditioned space 14.

More specifically, vaporized cryogen for operating vapor motor 114, independent of whether electrical control 124 is commanding cooling, heating, or null cycles in conditioned spaces 14 and 15, is provided by tapping conduit 31 via a tee 158 and drawing vaporized cryogen 20 from vessel 16 and from the pressure building and regulating arrangement 28. To reduce the amount of cryogen required to operate vapor motor 114 to provide the desired fan horsepower, the vaporized cryogen 20 is preferably heated in heating means 160.

Heating means 160 includes a heat exchanger 162 having a plurality of coil turns or loops 164 disposed within a suitable housing 166. An input side of heat exchanger 162 is connected to tee 158 via a conduit 168 which includes a valve 170; and, an output side of heat exchanger 162 is connected to an input side of vapor motor 114 via a conduit 171. An output side of vapor motor 114 is connected to an exhaust conduit 172. Heating means 160 includes a burner 173 which may be connected to conduit 152 from fuel source 148 via a valve 175, or a separate fuel source, as desired. In a stationary application, the $CO_2$ may be collected and compressed into a cryogenic state for reuse.

The separate, isolated heating arrangements for heating the secondary fluid 104 and for heating the cryogen for increased fan horsepower are preferred, as they eliminate the necessity of taking steps to prevent heat from being transferred to the secondary fluid 104 during a cooling cycle. However, with the proper thermal insulation, both heating functions may take place at a single location.

When electrical control 124 opens valve 175, burner 173 is ignited to provide a flame 177 which heats coil turns 164 and the vaporized cryogen therein to a desired temperature. Drawing vaporized cryogen 20 from vessel 16 is desirable because the heat of vaporization removes heat from the liquid cryogen 18.

If the fan horsepower requirements demand more vaporized cryogen than available from the upper portion of vessel 16, additional cryogen may be provided by tapping liquid conduit 24 via the hereinbefore mentioned connector 27, by providing a tee 176 in conduit 168, and by connecting an ambient coil or loop 178 between connector 27 and tee 176 via a valve 180. Ambient coil 178 may be provided with by-product heat produced by the operation of refrigeration system 10, in the same manner as hereinafter described in detail relative to coil 34. Additional vaporized cryogen may be provided without requiring the addition of ambient loop 178, by using heat generated by refrigeration system 10 during the normal operation thereof to enhance the heating of coil 34. This aspect of the invention is especially advantageous during low ambient temperatures. For example, as shown in FIG. 1, hot combustion gases produced by burner 173 and/or burner 150, are respectively directed from housings 166 and 147 to housing 35 via conduits 179 and 179' and a valve 181. Alternatively, as will be hereinafter described relative to FIG. 2, when the temperature of vaporized cryogen exiting exhaust conduit 172 exceeds the ambient temperature, exhaust conduit 172 may be directed to housing 35, to utilize heat in the vaporized cryogen exiting vapor motor 114, before the cryogen is vented to the atmosphere.

Pump drive motor 106 may be connected to an electrical power supply 182 which includes a battery 184. Battery 184 may be the main vehicle battery in a transport application, or a separate battery. Battery 184 is maintained in a fully charged condition by an alternator or generator 186 and an electric circuit 188. In a preferred embodiment of the invention, alternator or generator 186 is driven by vapor motor 114, such as via a pulley and drive belt arrangement 190. Alternator 186 may also be driven by cryogen exhaust 172.

Tees 58 and 72 are provided in fluid flow path portion 44 when refrigeration system 10 is utilized in an application which requires both refrigeration and air conditioning of separate conditioned spaces. For example, in a transport application associated with a driven vehicle 12, in addition to conditioning space 14, a driver's cab 192 may be air conditioned via the secondary fluid 104 while vehicle 16 is parked and occupied, making it unnecessary to operate the truck engine. An air conditioning arrangement 194 for cab 192 includes a heat exchanger 196 connected between tees 58 and 72 via a valve 198 and a check valve 199. Arrangement 194 also includes air mover means 201 which comprises a fan or blower 200 connected to a drive motor 202. Drive motor 202 may be an electric motor, for example, which is connected to electric circuit 188. Thus, the truck cab air conditioning system 194 may be operated with the truck engine off, even when battery 184 is the vehicle battery, as battery 184 is maintained in a fully charged condition by operation of vapor motor 114. A cabin temperature sensor 205 provides an input to electrical control 124.

Electrical control 124, in response to temperature sensor 205, operates valve 198 to by-pass a portion of the secondary fluid 104 or 104' around the first heat exchanger 46 and through heat exchanger 196. The temperature requirements in cab 192 will normally be consistent with the temperature requirements in conditioned spaces 14 and 15. For example, during cold ambient temperatures, the conditioned spaces 14 and 15 and cab 192 will predominately require heating cycles, and during warm ambient temperatures, the conditioned spaces 14 and 15 and cab 192 will predominately require cooling cycles. Valve 198 may be operated on/off to provide the desired heating or cooling, or valve 198 may be a valve which controls orifice size and thus the flow rate to obtain the desired heating or cooling.

When electrical control 124 detects the need for a cooling cycle in conditioned space 14 to maintain the associated set point temperature selected on set point selector 126, electrical control 124 energizes and thus opens valves 86 and 170, resulting in only valves 82, 86 and 170 being open, and electrical control 124 controls flow control valves 60 and 141 to respectively control the flow rate of the secondary fluid 104' through the first heat exchanger 46, and the flow rate of liquid cryogen 18 to slush tank 78. Cold secondary fluid in the form of slush mixture 104' is pumped from slush tank 78 to the first heat exchanger 46 via conduits 84, 52, 56, and 62. Heat in the return air 122 from conditioned space 14 is transferred to the slush mixture 104' and the resulting warmed slush mixture is pumped back to slush tank 78 via conduits 64, 70 and 80, where cryogen which has been vaporized by the added heat exits the fluid path 42 via vent 143. The heat of vaporization as the crystals of solid $CO_2$ evaporate in the first heat exchanger 46 provides a highly effective and efficient transfer of heat from the return air 122 to the mixture of cryogen and secondary liquid 104'.

When the second conditioned space and air conditioning apparatus 15 is connected in series with heat exchanger 46, and a cooling cycle is required in apparatus 15, flow control valve 100 is opened to allow secondary fluid 104' in conduit 64 to circulate through the associated heat exchanger. The temperature of a second conditioned space, indicated at 15, is selected via temperature selector 138 to be a higher temperature conditioned space than conditioned space 14. For example, conditioned space 14 may contain a frozen load, and conditioned space 15 may contain a fresh load. When both conditioned spaces contain fresh loads, conditioned space 14 would be associated with the load which requires the temperature to be maintained the closest to freezing point of 32° F. (0° C.).

When apparatus 15 is connected in parallel with heat exchanger 46 via connector 66' and conduit 96' valve 100 is opened by electrical control 124 to allow secondary fluid 104' in conduit 56 to circulate through the associated heat exchanger. In this embodiment apparatus 15 is not subject to the limitation of controlling to a higher temperature than the temperature in conditioned space 14.

If the air flow in conditioned space 14 during the cooling cycle is insufficient, as detected by an air flow rate feedback sensor 203, or by a speed or RPM sensor 207 associated with vapor motor 114, control 124 opens valve 180, when ambient loop 178 is provided; or control 124 opens valve 181 when it is desired to add by-product heat to pressure regulating coil 34.

When a heating cycle is required to hold the set point temperature in conditioned space 14, electrical control 124 closes valves 82 and 86, to completely isolate slush tank 78 from the secondary fluid flow path 44, valves 92 and 154 are opened, and burner 150 is ignited. The secondary fluid 104 is then pumped through the coil turns 146 of the second heat exchanger 88, with the heated secondary fluid 104 being directed to the first heat exchanger 46 via the now open valve 92 and conduits 52, 56 and 62. Secondary fluid 104 from heat exchanger 46 is directed back to the third heat exchanger 88 via conduits 64, 70, and 90. A defrost cycle to defrost and remove water ice which may build up on the first heat exchanger 46 during a cooling cycle, and on the heat exchanger associated with apparatus 15, is similar to the heating cycle, except damper 128 is closed, to prevent warm air from being discharged into conditioned space 14; or, alternatively, valve 170 may be closed during a defrost cycle and burner 173 turned off, to stop vapor motor 114 from operating during a defrost cycle.

If the second conditioned space 15 requires heat during a heating cycle associated with the first conditioned space 14, valve 100 is controlled accordingly. When conditioned space 14 is associated with a frozen load, a heating cycle for conditioned space 14 is unnecessary, and in the first or "series" embodiment of apparatus 15, a controllable by-pass arrangement 204 is provided which, when activated, by-passes the first heat exchanger 46. By-pass arrangement 204 includes the connector 66' in conduit 56, and a conduit 208 disposed between connector 66' and tee 66, with conduit 208 including a valve 210. Thus, electrical control 124 may independently serve the cooling, heating, and defrost requirements of conditioned spaces 14 and 15 by controlling valves 60, 100, and 210. If heat exchanger 46 requires defrosting and apparatus 15 requires cooling, heated secondary fluid 104 is passed through heat exchanger 46, by-passing apparatus 15 by closing valve 100 and opening valve 67. If apparatus 15 requires a defrost cycle while heat exchanger 46 requires cooling, valves 60 and 67 are closed and valves 210 and 100 are opened.

Figure 2:
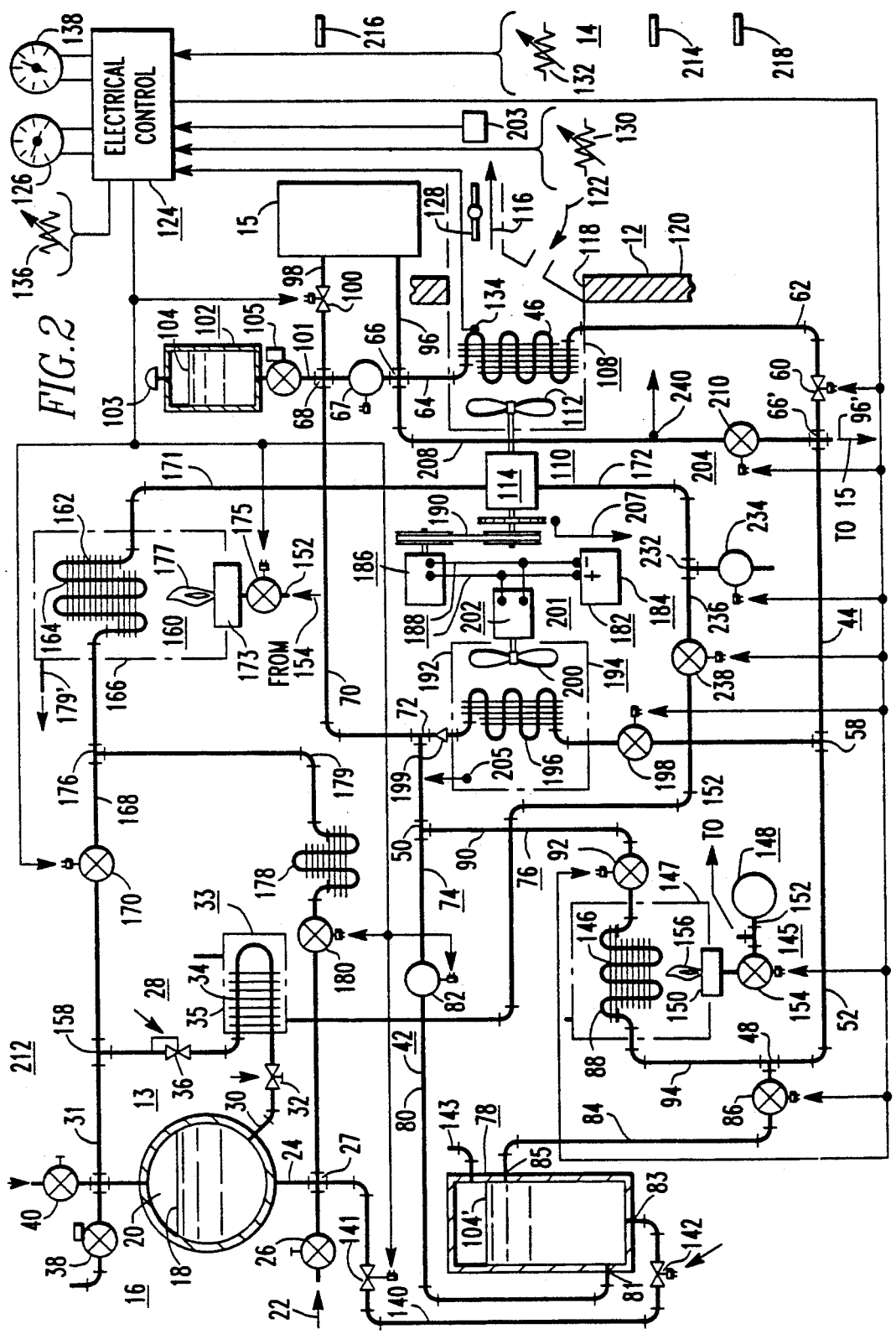
FIG. 2 is a diagrammatic representation of a refrigeration system which is similar to that of FIG. 1 except instead of using a pump for circulating the secondary fluid, a thermosiphon arrangement is illustrated.

FIG. 2 is a diagrammatic representation of a refrigeration system 212 which is similar to refrigeration system 10 shown in FIG. 1 except illustrating a thermosiphon arrangement for circulating the secondary fluid 104 and slush mixture 104', eliminating the need for pump 54 of the FIG. 1 embodiment. Like reference numerals in FIGS. 1 and 2 indicate like components and thus they are not described again relative to FIG. 2. In the thermosiphon arrangement of FIG. 2 it is important that slush tank 78 be located at an elevation higher than the elevation of the first heat exchanger 46, and that the first heat exchanger 46 be located an elevation which is higher than the elevation of the second heat exchanger 88. The relative elevations of the first heat exchanger 46, slush tank 78, and second heat exchanger 88 are respectively indicated at 214, 216 and 218.

In the thermosiphon arrangement of FIG. 2, during a cooling cycle, the secondary fluid mixture 104' leaving the first heat exchanger 46 will be warmer than the slush mixture 104' in slush tank 78, providing a thermal gradient which moves the warmer secondary fluid mixture upward to the slush tank 78, and the cooler secondary fluid mixture from the slush tank 78 downward to the first heat exchanger 46. Valve 92 will be closed to prevent circulation through heat exchanger 88. In like manner, during a heating cycle, valves 82 and 86 will be closed and valve 92 open. The secondary fluid 104 leaving the second heat exchanger 88 will be warmer than the secondary fluid in the first heat exchanger 46, providing a thermal gradient which moves the warmer secondary fluid upward to the first heat exchanger 46, and the cooler secondary fluid in the first heat exchanger 46 downward to the second heat exchanger 88.

Another distinction between the refrigeration system 212 of FIG. 2 and the refrigeration system 10 of FIG. 1 is in the use of warm vaporized cryogen exiting vapor motor 114 to selectively heat the pressure regulating coil 34, instead of using hot gases produced by burners 150 and/or 173. Exhaust conduit 172 is connected to a tee 232, with one branch, when open, discharging the cryogen to the atmosphere via a valve 234, or to vapor collection apparatus in a stationary application. The remaining branch, when open, connects the exhaust conduit 172 to the housing 35 which surrounds pressure building coil 34 via a conduit 236 which includes a valve 238. Thus, when the temperature of the cryogen exiting vapor motor 114, detected by a temperature sensor 240, exceeds the ambient temperature detected by temperature sensor 136, and vapor motor 114 requires more horsepower to increase the air flow rate in conditioned space 14, as detected by air flow sensor 203 or speed sensor 207, control 124 closes valve 234 and opens valve 238, to direct the warm cryogen to coil 34 within housing 35.

While not illustrated, it is to be understood that in transport applications blowers and/or fans driven by electrical motors powered by the vehicle electrical system, or any other suitable source, may augment and/or replace the vapor motors, for moving air between the conditioned spaces and the associated heat exchangers. This is also applicable to stationary applications, with electrical mains being used to power electrical motors connected to fans and/or blowers. Also, in transport applications, the vapor motors may drive electrical generators or alternators for the purpose of charging batteries associated with the refrigeration system control.

We claim:

1. A refrigeration system associated with a conditioned space to be controlled to a predetermined set point temperature via heating and cooling cycles, with the refrigeration system including heating means and cryogenic cooling means which includes a supply vessel containing a cryogen, the improvement comprising:
    a slush tank,
    expansion means connecting the supply vessel and said slush tank,
    a fluid flow path which includes said slush tank,
    a predetermined secondary liquid in said fluid flow path and said slush tank,
    said expansion means expanding cryogen directly into the secondary liquid of said slush tank, forming a slush mixture of cryogen and secondary liquid,
    first and second heat exchanger means in said fluid flow path,
    said first heat exchanger means being disposed to condition the conditioned space,
    said second heat exchanger means being in heat exchange relation with the heating means,
    means configuring the fluid flow path to interconnect the first heat exchanger means and said slush tank when the conditioned space requires a cooling cycle,
    means configuring the fluid flow path to interconnect the first and second heat exchanger means when the conditioned space requires a heating cycle,
    and means for circulating said secondary liquid through said first heat exchanger means during cooling and heating cycles.

2. The refrigeration system of claim 1 wherein the means for circulating the fluid in the fluid flow path includes a pump.

3. The refrigeration system of claim 1 wherein the means for circulating the fluid in the fluid flow path includes a thermosiphon arrangement wherein the first heat exchanger means is disposed at a lower elevation than the slush tank, and at a higher elevation than the second heat exchanger means.

4. The refrigeration system of claim 1 wherein the secondary liquid is selected such that it remains in a liquid state while being cooled in the slush tank, and also while being heated in the second heat exchanger means.

5. The refrigeration system of claim 1 wherein the heating means includes a fuel supply which is ignited during a heating cycle to heat the liquid in the second heat exchanger means.

6. The refrigeration system of claim 1 wherein the fluid flow path includes an expansion tank.

7. The refrigeration system of claim 1 including air moving means for circulating air from the conditioned space in heat exchange relation with the first heat exchanger means, with the air moving means including fan means driven by vapor motor means, and wherein the vapor motor means is driven by cryogen from the cryogenic cooling means.

8. The refrigeration system of claim 7 including means for heating the cryogen, with the heated cryogen being the cryogen which drives the vapor motor means.

9. The refrigeration system of claim 7 wherein the supply vessel includes cryogen in a liquid state, and including pressure building means which vaporizes liquid cryogen from the supply vessel, with the vaporized cryogen maintaining a predetermined pressure in the supply vessel and also providing vaporized cryogen for driving the vapor motor.

10. The refrigeration system of claim 9 including means for heating the cryogen, with the heated cryogen being the cryogen which drives the vapor motor means, and means directing cryogen from the vapor motor means in heat exchange relation with the pressure building means, to enhance the transformation of liquid cryogen to vaporized cryogen for use by the vapor motor means.

11. The refrigeration system of claim 9 including means for heating the cryogen which generates hot gases as a by-product, with the heated cryogen being the cryogen which drives the vapor motor means, and means directing the hot by-product gases in heat exchange relation with the pressure building means, to enhance the transformation of liquid cryogen to vaporized cryogen for use by the vapor motor means.

12. The refrigeration system of claim 7 wherein the cryogenic cooling means includes cryogen in a liquid state, means for vaporizing said liquid cryogen, and means for directing the vaporized cryogen to the vapor motor means.

13. The refrigeration system of claim 1 including a vehicle having a cab space to be air conditioned, third heat exchanger means associated with said cab space for conditioning the air thereof, and means for selectively directing at least a portion of the fluid in the fluid flow path through said third heat exchanger means.

14. The refrigeration system of claim 13 including electrical generator means driven by the vapor motor, and including air mover means for circulating air in the cab space in heat exchange relation with the third heat exchanger means, with said air mover means including fan means driven by electric motor means, with electrical energy for driving said electric motor being at least in part being provided by said electrical generator means.

15. The refrigeration system of claim 14 wherein the vehicle includes a battery, with the electrical generator means charging said battery, at least while liquid in the fluid flow path is conditioning the cab.

* * * * *